United States Patent Office 2,764,724
Patented Sept. 25, 1956

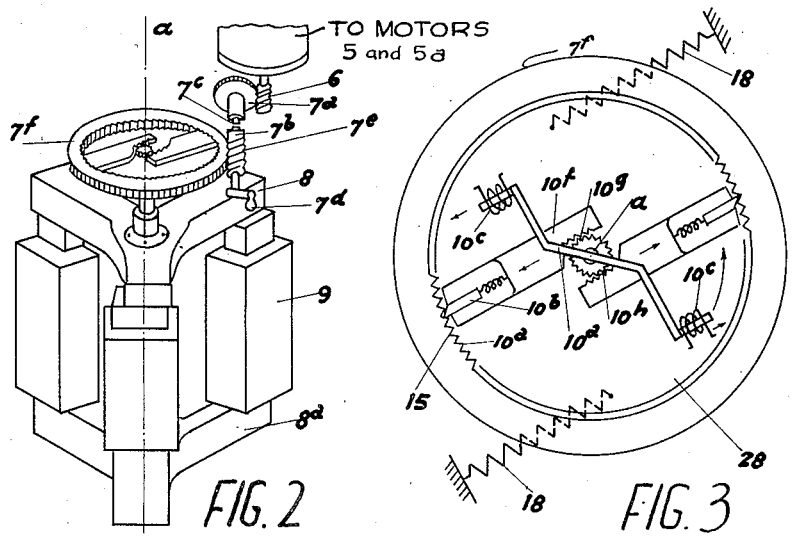
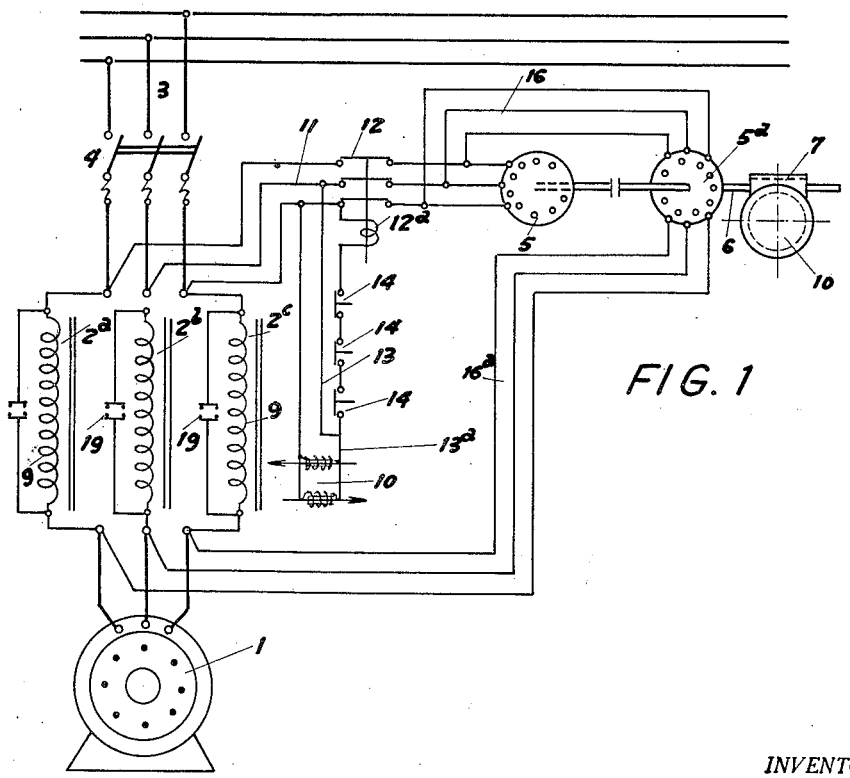

2,764,724

ELECTRIC STARTING DEVICE FOR INDUCTION MOTORS HAVING A SHORT-CIRCUIT ROTOR

Giovanni Dragonetti and Pietro Piroli, Rome, Italy

Application April 14, 1953, Serial No. 348,746

Claims priority, application Italy April 19, 1952

12 Claims. (Cl. 318—229)

The present invention relates to electric starting systems and means for induction motors, including a variable impedance consisting of reactance coils which are connected in series to the motor and the power supply network. The reluctance of the magnetic circuit of said reactance coils is varied gradually and automatically, in relation to the motor acceleration, by means of a controlling electromechanical device, the aforesaid control device operating in accordance with the rotor acceleration, and having applied to it a resultant of the supply voltage and the drop in voltage of the connected reactance coils. The controlling electromechanical device may provide a gradual and automatic increase of air gaps between iron cores of the reactance coils and a mobile yoke at the head of the iron core assembly.

As is known, machines such as centrifugal pumps and compressors are very often driven by a motor of the double squirrel cage or like type, the machines having suitable means to enable their starting on no load and a starting torque of the motor being required.

It is also known that electric motors of said type are normally started by means of three-phase auto-transformers of the standard type, of the open delta type, or by means of connected impedance coils, and sometimes also with the inclusion of a resistance in the case in which a motor is not provided with particular auxiliary stator coils.

An object of these known starting devices is to reduce the voltage applied to the motors and thus to reduce the current and the available torque, the said torque having such a value that it allows normal starting.

These known arrangements are however based on operation on a time basis, that is to say, the voltage applied to the motor during starting is increased in steps with a predetermined time interval between each step. Disconnection of the controlling means is effected when the voltage applied to the motor is the full supply voltage.

Due to variable conditions during the starting period, however, it may happen that starting means which are regulated on predetermined periods operate unsatisfactorily and become dangerous, tending to cause damage.

The means forming the subject of the present invention, on the contrary, have as an object to enable the starting time to become a function of the motor acceleration, by means of the inclusion of a variable impedance including a system of reactance coils, connected in series between the motor and the supply. The impedance value of the coils is diminished by means of a gradual and mechanically effected increase of the magnetic reluctance of the magnetic circuit of the coils determined as a function of the speed of the motor and obtained by means of a gradual increase of the air gap between iron cores of the reactance coils and a mobile yoke or spider that is a part of said magnetic circuit; said increase being controlled by means of an electromechanical control system operating according to a differential function of the supply potential and of the voltage drop across the impedance coils.

A suitable electromechanical device is also provided according to the present invention so as to make practical adjustment possible and to enable restoration of the device to the starting position, so as to make it ready for a subsequent operation.

Some embodiments of the invention will be described, by way of example, with reference to the accompanying drawings, wherein Figure 1 is a circuit diagram of a first embodiment, showing starting means for a double squirrel-cage three-phase asynchronous motor;

Figure 2 is a perspective view of a part of starting means included in the circuit according to Figure 1; and Figure 3 is a plan view of a detail of the apparatus shown in Fig. 2;

Figure 4:
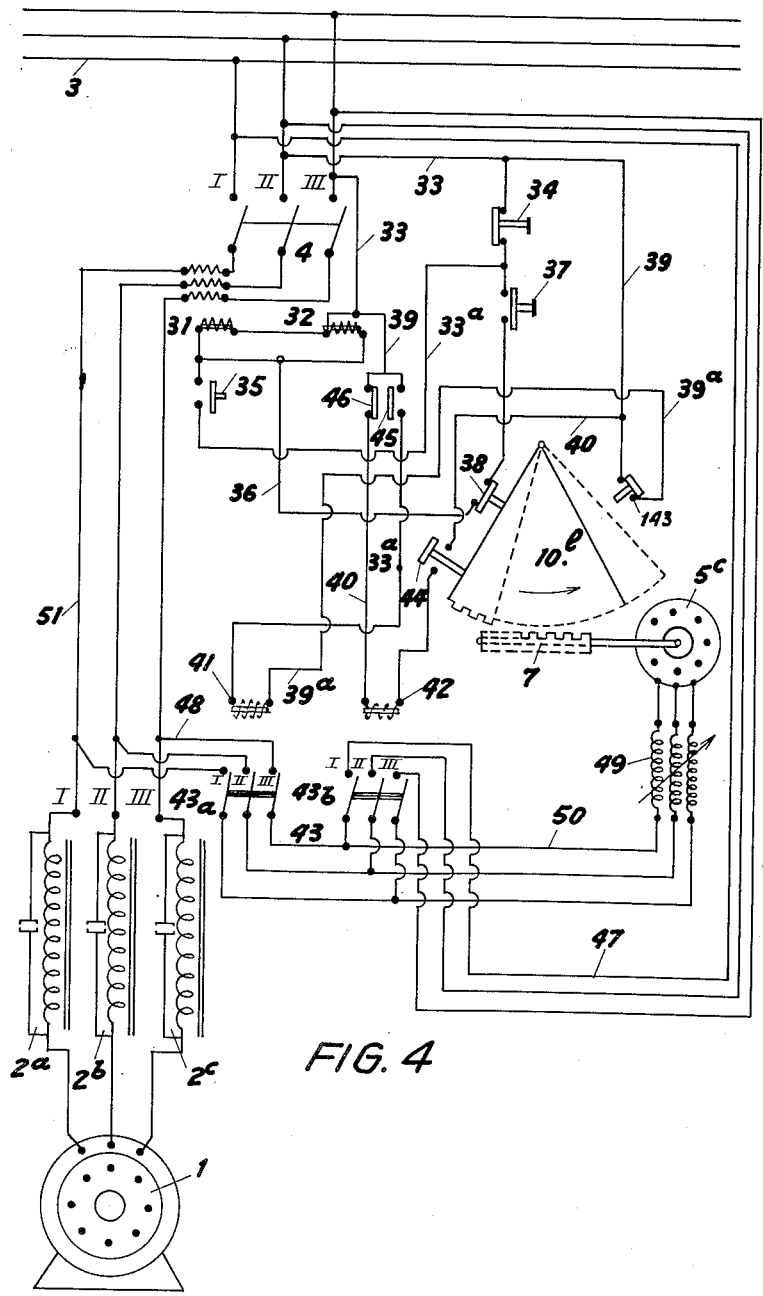
Figure 4 is a circuit diagram of yet another embodiment which has one auxiliary motor for controlling the electromechanical device and another means for restoring the system to the starting position.

With reference to Figure 1, the driving motor is connected through three impedance coils $2a$, $2b$, $2c$ in series with supply means 3. The main switch unit 4 may be multi-polar, each pole having individual means for the protection of the apparatus so that abnormal conditions of current or voltage able to injure the several elements of the starting means or of the motor cannot be transmitted thereto.

This embodiment of the invention is provided with a control gear which is operated by the differential action of two auxiliary asynchronous motors 5 and $5a$ having the rotors in opposition. Motor 5 is arranged to be supplied with current from the network 3 and motor $5a$ is arranged to be supplied with current from the network 3 and the output terminals of the feeder impedance coils $2a$, $2b$, $2c$, which are connected also to the driving motor 1, so that motor $5a$ is thus fed under the action of the difference of potential which is effected in the impedance coils during the starting of the motor 1.

The differential action of the motors 5 and $5a$ on a common driven shaft 6 is utilized by means of a mechanism which is generically marked 7 in Figure 1, whereby the value of the impedance of the reactance coils is varied gradually as a function of the acceleration of the rotor of the driving motor 1, the voltage of the supply to the motor 1 being gradually increased.

Variation of the impedance of the reactance coils by the means 7, which is illustrated in Figures 2 and 3, is obtained by modification of the air-gap of the iron core of windings 9 of coils $2a$, $2b$, $2c$. Short-circuit switches 19 are provided for windings 9.

Conductors 11 connect the windings of motor 5 to the input terminals of the impedance coils $2a$, $2b$, $2c$, through a triple-pole switch 12 operable by means of an electromagnet $12a$ fed with current from a circuit 13 branched off from two of the conductors 11. Switches 14 included in the circuit 13 are adapted to open when the system is in the state in which the supply voltage is impressed on the motor 1.

Current passing through the circuit 13 is used for the operation of an electromechanical system, generically marked 10 in Figure 1, the system providing a mechanical connection between the mechanism 7 and a member which effects variation of the reactance.

The exciting windings of motor $5a$ are connected to the conductors 11 between the switch 12 and motor 5 by means of conductors 16 and are also connected to the output terminals of the impedance coils $2a$, $2b$, $2c$, by means of conductors $16a$.

Figure 2 and Figure 3 show schematically an embodiment of the control device 7, the construction being adapted for an arrangement of reactance coils which are connected in series with the driving motor and have a three-branch magnetic iron core, with a symmetrical distribution of the flux. The iron core comprises two parts; one part 8a having three parallel cores which are symmetrical with respect to the longitudinal axis of symmetry a of the unit, the coils 9 being wound each on one of the three cores which are unitary with a base yoke or spider; the other part comprising an upper yoke or spider 8 which can turn, with respect to the first part, around axis a. The differential action of the motors 5 and 5a allows the determination of the relative angular displacement of the yoke 8 with respect to the part 8a, the displacement increasing with the torque resulting from the auxiliary motors 5 and 5a, as a function of the variation of the acceleration of the motor 1.

The mechanism 7 may comprise a gear transmission 7a, a shaft 7b which is divided in two parts with a coupling 7c between them serving for disconnection of the drive shaft 7b from the shaft 6, and a crank 7d for permitting angular displacement manually of the yoke 8. A worm 7e is connected with the shaft 7b, and meshes with a worm wheel rim 7f. The connecting device 10, shown in Figures 2 and 3, is constituted by a circular rack 10a inside the worm wheel rim 7f, a locking pawl 10b engaging the rack and an electromagnet 10c adapted to actuate the pawl 10b, the winding of the electromagnet 10c being traversed by the current in the circuit 13a (Figure 1). It is preferable for the balance of the system to use two pawls 10b symmetrically disposed with respect to the axis a so as to determine the locking by means of a torque. Electromagnets 10c operate a lever 10d having symmetrical arms and a fulcrum a in the center of the rim 7f, the lever actuating supporting plates 10f of the locking pawls 10b by means of a double rack connection 10g—10h.

The teeth 15 of the circular rack 10a are saw-shaped, their profiles being nearly radial on one side, and oblique to the radius on the opposite side in such a way that the pawl 10b effects locking only when the rim 7f rotates in one direction. The pawl 10b trips and passes from tooth to tooth when the rim 7f rotates in the opposite direction, by virtue of its having a suitably shaped head and elastic recoil means. The assembly of pawls 10b and the control means therefor are supported by a plate 28 which is connected with the upper yoke 8.

The embodiment shown in Figures 1–3 operates as follows:

The machine which is to be driven by the motor 1 is controlled so as to allow the starting of the motor 1 on no load. The main switch 4 is closed. Current traverses the circuit 13 and excites the electromagnet 12a which maintains the switch 12 closed. Meanwhile the electromechanical means 10c, 10d, 10g, 10h are operated by current in the circuit 13a so that the members or pawls 10b will be shifted and a suitable connection established between the shaft 6 and the yoke 8. When the assembly is in its starting position, the switches 14 are closed, their actuating members being placed in the locus of the yoke 8 so as to be opened by it when it attains the limit of its angular displacement, which corresponds to normal operation of the motor 1. When the rotor of the motor 1 is not rotating, there is maximum voltage drop in the reactance coils 2a, 2b, 2c, and a maximum torque is generated in the motor 5a, with a suitable direction of rotation; motor 5 is so proportioned that an equal torque is therein generated by the supply voltage, this second torque having an opposite direction with respect to the torque of motor 5a; therefore no displacement of shaft 6 is effected.

The voltage in the reactance coils 2a, 2b, 2c diminishes when the rotor of motor 1 begins to move and the torque of the motor 5a diminishes as a function of the speed of the rotor 1 so that a resultant mechanical differential action on the shaft 6 is consequently generated by the means operating as above described. This differential action is transformed by means of the mechanism 7 into angular displacement of the yoke 8 and an increase of the reluctance of the air-gap is thereby effected which corresponds to a reduction of the impedance, the reluctance value thus tending to rise with acceleration of the rotor of motor 1. The opening of the switches 14 takes place when the rotor of motor 1 attains its normal speed, this corresponding to the limit of angular displacement of the yoke 8 with respect to the unit 8a, opening of the switches 14 being directly or indirectly effected by the motion of the yoke 8 at said limit. As a consequence the circuit 13 is opened; the relay 12a, which is no longer excited, opens the circuits 11 by the switch 12 and the short-circuit switches 19 close at the same time. In this way both the motors 5a and 5b are de-energized. Part of the mechanical energy furnished by the motors 5, 5a serves to strain elastic return means which may comprise springs 18, which are strained during the rotation of the yoke 8 and return said yoke to its starting position when the switch 4 opens, the electromechanical connection 10 being switched off as a consequence of the opening of circuit 13.

It will be noted that the differential motor unit 5, 5a of Figure 1 may be replaced by various substitutes therefor. One such is a combination of a servomotor and a differential control relay, provided with suitable transformer devices and rectifiers. Another alternative structure would be two D. C. motors fed by means of a voltage transformer, current transformers and rectifiers, with direct current and having a differential operation equivalent to that of the first described embodiment. Still another usable structure would comprise two differentially operating single-phase alternating current motors, fed respectively through a single-phase voltage transformer and a three phase input single-phase output current transformer.

With reference to Figure 4, the starting means comprises a modification of the electromechanical device which determines the gradual and automatic variation of the reluctance, and of the means provided for the return of the parts to the starting position. As regards the electromechanical control device, it is to be observed that a magnetic attraction is generated in the iron core of the reactance coils, which are formed as illustrated in Figure 2. The magnetic attraction is a function of the intensity of the current which traverses the rotor, and of the consequential acceleration of the rotor, such magnetic attraction tending to oppose the rise of the reluctance. As a consequence, the differential action of the torque generated by said magnetic action, and an opposing torque generated by a unit having suitable characteristics, for instance an auxiliary motor subjected to the supply voltage, may be used in the electromechanical control device.

The dimensions of the aforesaid auxilary member 8 may be calculated in the same way as for the embodiments previously described, so that the force due to magnetic attraction is balanced by the force due to the auxiliary motor when the main motor is switched on. The reactance coils are disposed in such a way that they have the maximum voltage drop in these conditions.

The current in the driving motor 1 diminishes when the rotor of the driving motor begins to move, and the magnetic attraction on the mobile yoke 8 is reduced as a function of the acceleration of the rotor. A predominance of the torque generated by the auxiliary motor is a consequence, that is to say, a resultant rising torque is obtained, which effects displacement of the mobile yoke 8 with respect to the iron cores of the reactance coils 2a, 2b, 2c. This displacement causes a gradual rise of the reluctance in such a way that the voltage supplied to the motor gradually increases. The automatic short-circuiting of the connected resistance coils, which are thus put out of action, takes place when the rotor has attained the normal speed, the limit of displacement of the mobile yoke corresponding to this condition. It is to be noted that the integral use of the electromechanical control device illustrated in the embodiments shown in Figure 1 may be preferred in the case in which a predetermined starting curve has to be provided for special reasons. In such a case the differential action of two auxiliary members (for instance two motors), the characteristics of which may be varied according to the predetermined conditions, permits the accomplishement of said predetermined curve.

The coupling device used in the previously described embodiments is not used in the construction shown in Figure 4, as the displacement of the mobile yoke and its return to the starting position may be effected in this case by the same electromechanical control device which is used for the control of the variation of the reluctance of the starting device.

Referring now to Figure 4, the driving motor 1 takes the current from the supply leads 3 by means of conductors 51.

The main switch 4 is operated by control electromagnets 31 and 32 fed with current branched off above the switch 4, from the phases II and III for instance, and traversing two circuits which have in common a section 33 with a stop switch 34 therein, and sections 33a and 36 in parallel. A switch 35 in the section 33a is adapted to be mechanically closed and opened with the closure and opening of the main switch 4. A starting switch 37 and a switch 38 are disposed in the section 36, the switch 38 being closed when a toothed sector 10l connected with the mobile yoke of the reactance coils 2a, 2b, 2c is in its starting position.

Figure 4 shows the members which constitute the starting means in the position that they occupy before starting. The electromagnets 31 and 32 are not excited when the switch 35 in the circuit 33a and the switch 37 in the circuit 36 are open as the main switch 4 is also open and current does not reach the motor 1.

The operator closes the switch 37 when the motor 1 is to be started. Current then traverses the circuits 33—36—33, and the electromagnets 31 and 32 are thus excited and close the switch 4 and the switch 35 with it, in such a way that the electromagnet 31 will be held excited even when the circuit 36 is opened by switch 38, this taking place as soon as the starting device begins to work so that the toothed sector 10l and the mobile yoke begin to turn in the direction shown by an arrow in Figure 4.

As a consequence the main switch 4 is held closed until the stop switch 34 in the common section of the circuits 33—33a and 33-36 is operated.

Two other circuits having a section 39 in common and individual sections in parallel are also branched, for instance, off the same phases II and III above the switch 4, to feed coils of two electromagnets 41 and 42 which respectively operate switches 43a and 43b of a commutator device 43. The commutator connects conductors 48, which are branched off between the reactance coils 2a, 2b, 2c, and the switch 4, with conductors 50 ending at the auxiliary motor 5c, and also connects the conductors 50 with conductors 47 which take current from the supply leads 3 above the main switch 4.

The motor 5c effects angular displacement of the toothed sector 10l by the mechanism 7, and at the same time causes angular displacement of the mobile yoke 8 of the reactance coils 2a, 2b, 2c. The displacement is a function of the absorbed power of the motor 1, since the turning of the mobile yoke 8 around the axis a is a consequence of the torque which results from the combination of the attraction between yokes 8a and 8 and the driving torque generated by the auxiliary motor 5c. The resultant torque and the consequent rising of the reluctance vary as a function of the intensity of the current and therefore of the acceleration of the rotor of the motor 1.

It will be evident to those skilled in the art that there may be similar devices for the starting of motors with suitable modifications, which are not herein described or illustrated. In the aforementioned starting devices the electromagnetic control device may comprise only a direct-current auxiliary motor, provided with rectified A. C. current, or it may comprise a single-phase auxiliary motor with the corresponding three-single-phase transformer for three-phase supply. Likewise, the electromechanical control device according to Figure 4 may have a relay which operates a servomotor of any type, instead of motor 5c, such servomotor being independently fed.

A switch 143 in the circuit 39—39a, which supplies the electromagnet 41, is normally closed, being opened only when the toothed sector 10l attains the limit of its displacement corresponding to the state of the reactance coils 2a, 2b, 2c in which a maximum air-gap is achieved. A second switch 45 in the circuit 39a is held mechanically closed when the main switch 4 is closed and vice versa, operation of the switch 45 being analogous to that of the switch 35.

A switch 44 in the circuit 40, which supplies the electromagnet 42, is open when the sector 10l is in its starting position, closing mechanically at the moment when sector 10l leaves this position. Another switch 46 in the same circuit 40 is mechanically opened when the main switch 4 closes and vice versa.

The switch 43b connects the conductors 50 with the conductors 47 so as to reverse two phases in such a way that the rotation of the motor 5c, when supplied with current by the circuit 47, rotates in the opposite direction with regard to the rotation which takes place when the motor 5c is supplied by way of the conductors 48.

The circuit 39—40 is open at switch 44 when the unit is in the state precedent to its starting, as shown in Figure 4, and when the starting switch 37 is operated and the main switch 4 closes the switch 46 opens so that the winding 42 is not excited and the switch 43b is left open.

The switch 45 in the circuit 39—39a closes, on the contrary, when the main switch 4 closes, so that current traverses the electromagnet 41 thus effecting closure of the switch 43a, in such a way that the motor 5c is connected in the starting device. Variable impedances 49 are connected in the conductors 50 so as to make possible adjustment of the motor 5c according to the required characteristics.

The starting device is thus made ready for normal operations; the electromagnetic control device will then adjust the mechanical and gradual variation of the reluctance of the reactance coils, by means of the rotation of the sector 10l and of the mobile yoke therewith in such a way that the voltage furnished to the motor 1 varies gradually as a function of the required torque.

When the differential action is such that it effects angular displacement of the sector 10l, the latter leaves its starting position and allows closure of the switch 44 and the opening of the switch 38. As a consequence current no longer traverses the circuit 36 but the electromagnets 31 and 32 are held energized by means of the circuit 33a. The circuit 40 is subsequently closed by means of the closure of switch 44. In fact the sector 10l opens the switch 143 when it arrives at its limit position; in consequence of this the current no longer traverses the winding 41, thus allowing opening of the switch 43a to switch off the motor 5c.

The starting means shown in Figure 4 is such that the operation by which the different parts are returned to their starting positions, so as to be ready for the next operation, is mechanically effected at the moment in which the motor 1 is stopped.

For this purpose, the exciting circuits of the magnets 31 and 32 open when the operator pushes the stop switch 34 so as to stop the motor 1. As a consequence the main switch 4 opens and the switches 35 and 45 with it, while the switch 46 closes. The current than traverses the circuit 33, 39, 40 to excite the electromagnet 42 which closes the switch 43b, in such a way that the motor 5c is then directly supplied from the leads 3; but on account of the reversal of two phases the motor 5c rotates in an opposite direction and the sector 10l is thus returned to its starting position.

The electromagnet 42 is de-energized when the sector 10l reaches the starting position and opens the switch 44; the supply circuit of the motor 5c is then opened by switch 43b and the motor 5c is stopped. The switch 38 is moreover closed and the system restored to the starting condition as illustrated in the drawing.

What we claim is:

1. An electrical starting system for an induction motor connected to a current supply, comprising in combination a plurality of reactance coils connected between the motor and the current supply, said coils having magnetic cores including fixed portions having parallel axes and a movable portion which is rotatable on an axis parallel to the axes of the fixed portions, first means responsive to acceleration of the motor for increasing the reluctance of the cores gradually by a rotary displacement of the rotatable portion of the cores, second means for short-circuiting the reactance coils automatically in response to normal operating speed, and means for automatically resetting the aforesaid means to their starting condition.

2. An electrical starting system for an induction motor connected to a current supply, comprising in combination a plurality of reactance coils connected between the motor and the current supply, said coils having magnetic cores including fixed portions having parallel axes and a movable portion which is rotatable on an axis parallel to the axes of the fixed portions, first means responsive to acceleration of the motor for increasing the reluctance of the cores gradually by a rotary displacement of the rotatable portion of the cores, second means for short-circuiting the reactance coils automatically in response to normal operating speed, and means for automatically resetting the aforesaid means to their starting condition, said movable portion being a rotatable yoke and said second means including a differential control means responsive to the resultant of the supply voltage and the voltage drop across the reactance coils.

3. A system according to claim 2, wherein said motor is a three-phase motor having three current connections thereto, a reactance coil connected in series with each connection, said core having three branches arranged symmetrically about an axis and each having one winding of the reactance coils thereon, one end of each branch being connected to a fixed yoke, the movable yoke being mounted adjacent the other end of each branch for rotation about said axis.

4. A system according to claim 3, including switching means for simultaneously connecting the motor and the differential control means to the current supply, and for disconnecting the differential control means in response to its reaching a predetermined position.

5. A system according to claim 3, wherein the differential control means includes two auxiliary motors connected so as to tend to rotate in opposite directions, a common shaft connected to said auxiliary motors, means connecting one of the motors directly to the current supply, means for impressing the voltage drop across the reactance coils across the other auxiliary motor, the auxiliary motors being proportioned so that their differential action produces a rotation of said shaft which is a direct function of the speed of the induction motor.

6. A system according to claim 1, wherein the means for short-circuiting the reactance coils includes a switch connected across each reactance coil and means for closing said switches in response to the adjustment of the first means to the position corresponding to maximum reluctance.

7. A system according to claim 1, wherein said first means includes a control means for providing a force for moving the movable portion of the core in such a direction as to oppose the magnetic attraction between the fixed and movable portions of the core, said core being dimensioned so that the force of said magnetic attraction maintains said core portions in their positions of minimum reluctance before the induction motor starts, but said force of magnetic attraction is overbalanced by the force produced by the control means as the speed of the induction motor increases, whereby the movable portion of the core is moved from its position of minimum reluctance, and means for restoring the control means to its starting condition in response to disconnection of the current supply from the motor.

8. A system according to claim 7, wherein the movable portion of the core is a rotatably mounted yoke, said control means comprising an auxiliary motor connected to the current supply, a gear sector connected to the yoke, means connecting the auxiliary motor to the gear sector for causing angular displacement of the gear sector and the yoke, switching means for initiating said angular displacement in one direction when the induction motor is energised and for subsequently reversing the direction of angular displacement and returning said switching means, said gear sector and said yoke to their starting position, and means responsive to the return to the starting positions for de-energizing the control means.

9. A system according to claim 8, comprising a main switch connecting the induction motor to the current supply, two electromagnets for operating said switch, means for supplying current to the electromagnets from the supply side of the main switch including two parallel circuits, a motor stop switch connected so as to open both circuits, a switch in one of said two circuits connected to operate in unison with the main switch, a normally closed switch in the other of said two circuits connected so as to open when said control means begins to operate.

10. A system according to claim 9, in which the switching means includes a switch and electromagnetic control means therefor for connecting the auxiliary motor to the load side of the main switch during the starting period and for connecting the auxiliary motor to the supply side of the main switch in such a manner after the starting period as to reverse the direction of rotation of the auxiliary motor.

11. A system according to claim 10, including means for energizing the electromagnetic control means from the supply side of the main switch in response to the closing of the main switch and ending said energizing when the control means reaches a given position.

12. A system according to claim 1, wherein the resetting means includes a detachable coupling between the first means and the rotatable portion of the core, said coupling including a circular rack and a pawl in cooperative relation, electromagnetic means for decoupling the pawl from the rack when the motor is de-energized, and means for returning the rotatable portion of the core to its starting position when said rack and pawl are decoupled.

References Cited in the file of this patent

UNITED STATES PATENTS

| | | |
|---|---|---|
| 1,184,262 | Redfield | May 23, 1916 |
| 1,296,698 | Redfield | Mar. 11, 1919 |
| 1,905,720 | Jones | Apr. 25, 1933 |
| 2,299,911 | Logan | Oct. 27, 1942 |
| 2,471,185 | Antipovitch | May 24, 1949 |